Patented Nov. 27, 1934

1,982,028

UNITED STATES PATENT OFFICE 1,982,028

ACTIVATION OF MATERIALS

George Sperti, Covington, Ky., assignor to General Development Laboratories, Inc., New York, N. Y., a corporation of Delaware No Drawing. Application December 28, 1929, Serial No. 417,267

6 Claims. (Cl. 99—11)

My invention is related to the activation of materials, and particularly to the activation of vitamin D in food products, or ergosterol.

It has been known that ergosterol could be activated with more or less success by the application of ultra violet light, and a considerable percentage of it converted into vitamin D. It has been supposed hitherto that these were the only useful radiations for activation of ergosterol, as set forth in British Patent No. 236,197, of 1926 to Steenbock. It is also known from my own work that by a proper filtering of ultra violet light, an activation can be obtained without danger of destructive action.

One of the objects of my invention is an activation process for activatable food products, ergosterol in edible form and like substances containing the pro-vitamin, in which I secure the desired effect by radiations outside of that spectral band which is called the ultra violet. Another object of my invention is the activation of ergosterol and other substances containing the pro-vitamin with rays having greater penetrative power than the ultra violet rays, and particularly with X-rays.

I have discovered that ergosterol and food substances containing ergosterol may be activated with what are known as "soft" X-rays; and I accomplish the objects of my invention by the process hereinafter more specifically set forth.

The term "soft" X-rays is applied to X-rays having the longer wave lengths (roughly from 2 Angstrom units to 13 A. U.). The term "hard" X-rays is applied to X-rays of shorter wave length. Soft X-rays can be produced by tubes comprising an evacuated chamber having therein a suitable cathode and a target of suitable material, the tube usually being fitted with a window of aluminum, cellophane, Lindemann glass, or other material which will allow the desired radiations to pass through without undue absorption. The ordinary glass X-ray tube emits only hard X-rays because of the high absorption of the soft rays by ordinary glass. The tube is operated from a source of current of high voltage, and the substance to be irradiated is placed beneath the window in the path of the rays.

I may use one of these tubes and cause the X-rays formed thereby to impinge upon ergosterol in a suitable container. Where the rays have to pass through the container, one is chosen which will not substantially intercept them. I have discovered not only that soft X-rays are absorbed by ergosterol (which appears to be a sine qua non in all irradiation effects) but that the soft X-rays very rapidly and thoroughly activate the ergosterol.

My invention is not confined to the irradiation of ergosterol. It is applicable to a large variety of food products, oils, etc. which contain constituents such as ergosterol that may be activated to vitamin D. As examples, but without limitation, my invention is useful in the irradiation of yeast, breakfast foods, etc., to be used as foods for infants, the irradiation of chicken feeds to insure strong bone development in chicks, the irradiation of ergosterol to convert it to vitamin D, for addition to food products, oils, etc., and the treatment of rickets in children.

It has been believed heretofore that activation ceased as the radiations approached the short-wave-length end of the ultra-violet spectrum. Many have stated that the extremely short ultra-violet radiations possessed a marked de-activating effect with practically no activating effects at all, and also that no activation can be obtained with X-rays. I have discovered the activating effects of soft X-rays.

The use of soft X-rays in irradiation is advantageous in several important respects over the use of ultra-violet light. X-rays are not confined substantially to surface effects as are ultra-violet rays for the most part. The greater penetration of soft X-rays makes it possible to activate materials more thoroughly, and to activate materials to a considerable depth which are opaque to ultra-violet light. The use of X-rays is also advantageous because the material to be treated does not have to be in solution, nor in a form through which ultra-violet will penetrate in order to get activating effect throughout the whole mass. My experiments indicate that the time for satisfactory activation is probably considerably less than with ultra violet light, and this will indicate a further economy in the use of soft X-rays.

Having thus described my invention, what I claim as new and desire to secure by Letters Patent, is:—

1. That process of increasing the vitamin content of food substances which comprises subjecting them to radiations of the character known as soft X-rays having wave lengths between approximately 2 and 13 Angstrom units.

2. That process of activating ergosterol in edible form which comprises irradiating said substance with radiations having wave lengths between approximately 2 and 13 Angstrom units.

3. That process of activating ergosterol in edible form which comprises subjecting the said substance to the radiations produced by a soft X-ray tube having wave lengths greater than 2 Angstrom units.

4. That process of increasing the vitamin content of food substances which comprises irradiating them with rays having substantial penetrating power as well as activating effect, the said rays being of the character known as soft X-rays and having wave lengths greater than 2 Angstrom units.

5. The process of increasing the vitamin content of foods which consists in placing the foods in a container capable of transmitting soft X-rays and then exposing the container to irradiation with soft X-rays.

6. The method of irradiating food substances containing ergosterol to increase their vitamin content which consists in packaging the food in containers of material which transmits soft X-rays and irradiating the food in the containers with soft X-rays.

GEORGE SPERTI.